July 27, 1965 K. A. MILETTE 3,197,242
COUPLING
Filed June 13, 1960 2 Sheets-Sheet 1
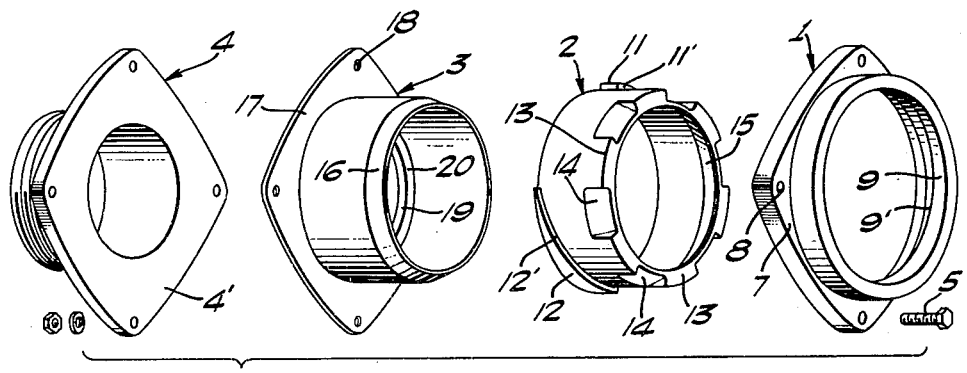
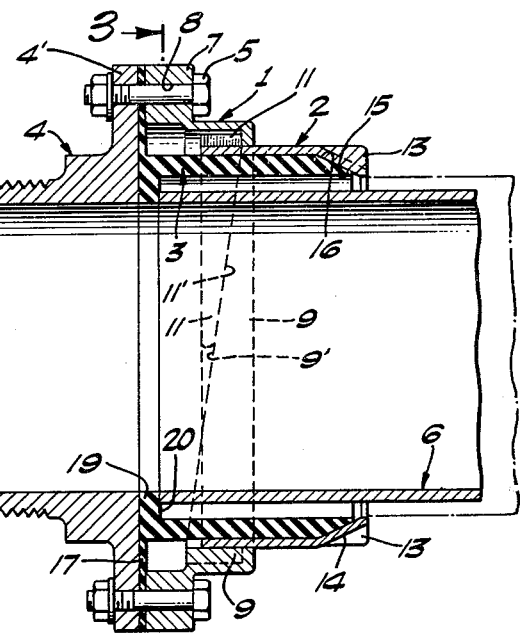
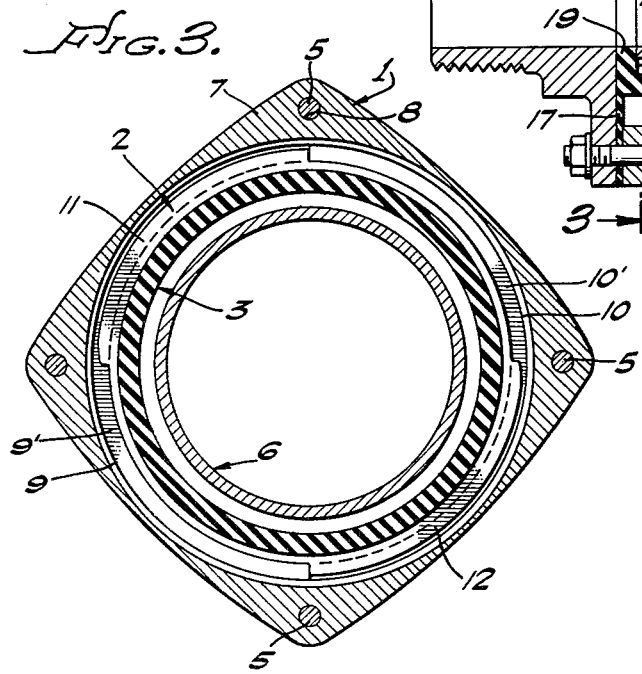
KENNETH A. MILETTE
INVENTOR.
BY Paul A. Weilein
ATTORNEY

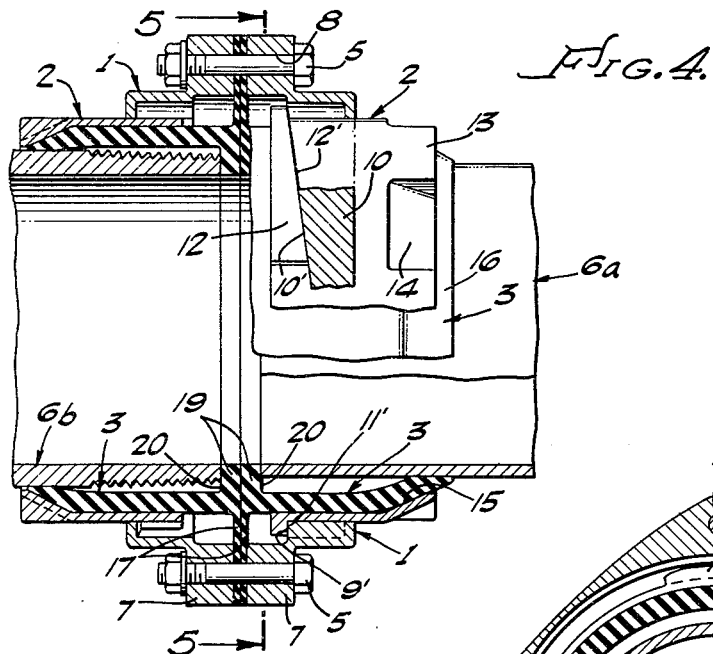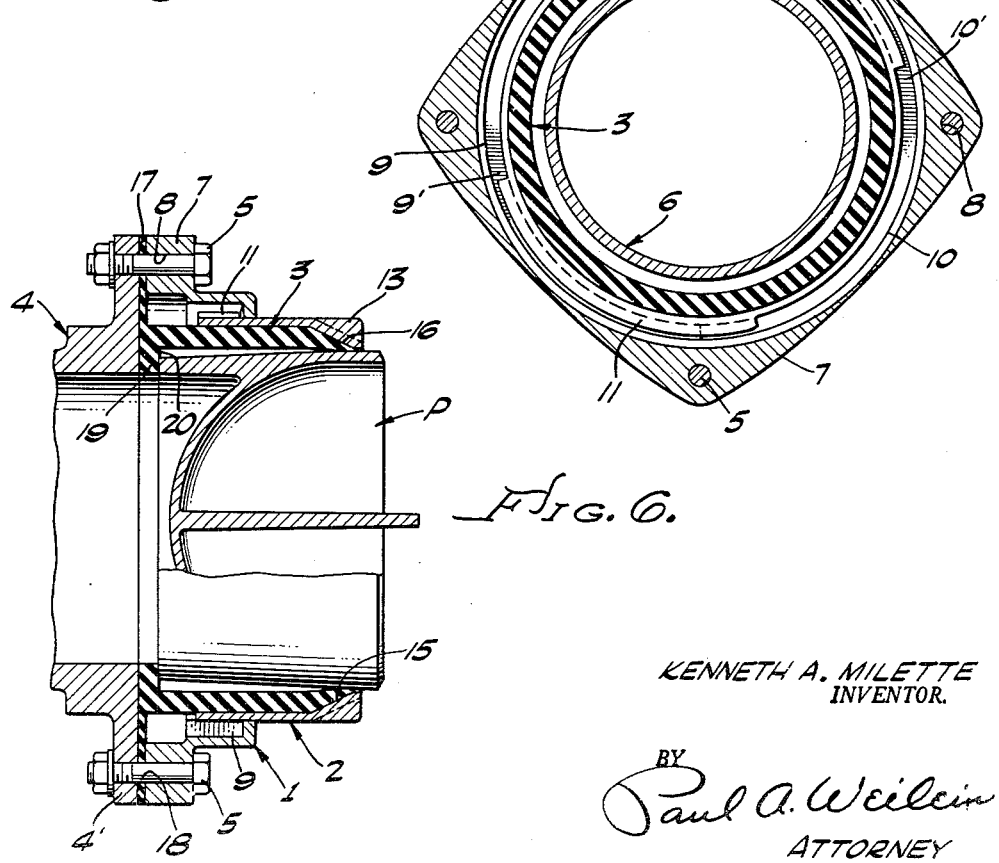

United States Patent Office 3,197,242
Patented July 27, 1965

3,197,242
COUPLING
Kenneth A. Milette, La Puente, Calif., assignor to Mission-West Manufacturing Company, Los Angeles, Calif., a corporation of Delaware
Filed June 13, 1960, Ser. No. 35,616
10 Claims. (Cl. 285—175)

This invention relates to couplings of the quick action type for coupling conduits and similar members.

It is an object of this invention to provide a simply constructed, compact and inexpensive coupling which in a given size, may be used efficiently for connecting large diameter conduits of different diameters, as in plumbing installations for house trailers and in other installations where plumbing regulations require use of quick action couplings or such use thereof is desired.

While the coupling of this invention is well suited for use in connection with large diameter conduits employed for the purposes above noted, it may be made in other sizes and used advantageously as an all purpose coupling in view of the simplicity, compactness and inexpensiveness of construction thereof and the fact that it will provide a fluid tight seal and may be coupled and uncoupled with a simple limited rotative movement of one readily operable element thereof.

It is a further object of this invention to provide a coupling such as described having a novel and efficient form of sealing means which lines the bore through the coupling and forms a fluid tight seal throughout the coupling and around the conduit or other member connected to the coupling.

Another object is to provide a coupling such as described which in one size will accommodate the ends of conduits of a reasonable range of different diameters and wall thicknesses, whether the conduit ends be threaded or plain, with assurance in each case of a reliable coupling action and a fluid tight seal through the coupling and around the conduit.

It is another object of this invention to provide a coupling such as described wherein in one embodiment the sealing sleeve forms at opposite ends thereof a fluid tight seal around the conduit coupled to the coupling and at the joint of the coupling with a fitting or other supporting member.

An additional object of this invention is the provision of a coupling which consists of but three simply constructed members comprising a pair of coupling members having through bores and mounted one within the other for relative rotative and axial movement, and a sealing sleeve of elastic material mounted in the bore of the inner coupling member, the inner coupling member and sleeve having portions cooperable upon relative axial movement of the coupling members as effected by relative rotative movement thereof, to urge the sleeve into gripping and sealing engagement with a conduit or the like to be coupled.

A further object is to provide a coupling such as next above described which is adapted to be mounted on an outlet or inlet fitting for passing fluid therethrough or on any other element as a support for a coupling and which has a bore or opening in registration with that of the coupling, for example, tank outlets or inlets, valves or other fluid passage means, the mounting of the coupling in this manner providing a means for securing the sealing sleeve in place subject to being moved into and out of sealing and gripping relation to the conduit connected with the coupling. In addition, the coupling may be assembled back to back with a similar coupling, due to novel constructional details to be hereinafter more fully described.

Additionally, it is an object of this invention to provide novel cam means between the relatively rotatable and axially movable coupling members mounting the sealing sleeve, the cam means maintaining the coupling members in assembled relation as well as making possible a secure coupling and sealing operation responsive to limited angular movement of one of the coupling members about the axis of the coupling.

Other objects and advantages of the invention will be hereinafter described or will become apparent to those skilled in the art, and the novel features of the invention will be defined in the appended claims.

Referring to the drawings:

FIG. 1 is an exploded view of a coupling embodying this invention with the parts shown in perspective and in the order in which they may be assembled in accordance with one usage on a suitable fitting which is also shown in perspective;

FIG. 2 is a longitudinal sectional view of the coupling as assembled for use with one form of support which constitutes a fitting for passage of fluid therethrough, showing the coupling as would appear with the conduit positioned to be coupled thereto, the dot-dash lines paralleling the conduit indicating the adaptability of the coupling to conduits of larger diameter than shown in full lines;

FIG. 3 is a sectional view taken on the line 3—3 of FIG. 2;

FIG. 4 is a sectional view partly in elevation, of a double ended coupling embodying the invention, with certain parts of one coupling end broken away to show a cam element on the rotatable coupling member in elevation and the cam element of the nonrotatable coupling member partly in section, the parts of the coupling being in the position assumed when the coupling operation is completed to grip and form a seal around a conduit;

FIG. 5 is a sectional view taken on the line 5—5 of FIG. 4; and

FIG. 6 is a fragmentary sectional view with a plug shown partly in elevation closing the coupling and held therein by the sealing sleeve.

In the accompanying drawings the illustrative embodiment of this invention comprises a coupling consisting essentially of but three parts, namely, a pair of coupling members 1 and 2 and a sealing sleeve 3, each having bores extending axially therethrough. These parts, as here shown, are held in assembled relation with the coupling member 1 nonrotatably secured to a fluid outlet or inlet fitting 4 by means of screw fastenings 5, and the bore of the sleeve 3 in registration with the bore of the fitting 4. In this connection it should be noted that the coupling per se comprised as here shown, of the nonrotatable coupling member 1, rotatable inner coupling member 2, and sleeve 3, may be secured to various forms of supports or fittings such as that designated 4 or to outlets or inlets of tanks, valves and the like for passing fluid through the coupling into or from a conduit 6 when the latter is connected to the coupling.

The coupling member 1 may be made of suitable metal or plastic material in the form of an annular housing having a large bore therethrough and provided at one end with a radially extended marginal mounting flange 7 having holes 8 therein for reception of the fastenings 5 to secure the coupling member as shown in FIG. 2 to the fitting 4. Also provided on the nonrotative coupling member 1 interiorly thereof are two cam elements 9 and 10 which provide arcuate cam shoulders 9' and 10' disposed radially of the axis of the coupling member. Each of these shoulders extends helically about the interior of the coupling member for approximately 180°.

The coupling member 2 is constructed so as to be disposed in the bore of the coupling member 1 for rotative and axial movement relative thereto and is in the form of an annulus made of suitable metal or plastic material and having greater axial extent than the coupling member 1. On its exterior adjacent one end the coupling member 2 is provided with arcuate cam elements 11 and 12 defining cam shoulders 11' and 12' disposed radially of the axis of the coupling member 2. Each of these shoulders extends helically about the exterior of the coupling member 2 for approximately 90°. The shoulders 11' and 12' on the coupling member 2 are disposed inwardly of and against, or in other words, behind the cam shoulders 9' and 10' on the coupling member 1 when the two coupling members are assembled as shown in FIG. 2. With this arrangement the shoulders provide for limited axial movement of the coupling member 2 when the latter is rotative relative to the coupling member 1. Moreover, these shoulders also act as stops to prevent axial outward withdrawal of the coupling member 2 through the coupling member 1.

Gripping lugs 13 with depressions 14 therebetween are provided on the exterior of the outer end of the coupling member 2 to facilitate rotative movement of the coupling member 2 as required to effect the coupling and uncoupling operations.

Within the coupling member 2 there is a conical wall portion 15 restricting the outer end portion of the bore through the coupling member and which, as will be hereinafter described, cooperates with a beveled exterior portion 16 at one end of the sealing sleeve 3 to cause the sleeve to be uniformly circumferentially deformed so as to grip the conduit 6 and form a fluid tight seal therearound.

The sealing sleeve 3 is formed of any suitable elastic material such as rubber, synthetic rubber or a plastic having requisite elasticity to return to original form when pressure is removed therefrom and which is capable of forming a fluid tight seal when deformed radially inwardly into engagement with a conduit such as the conduit 6, whether the end of the conduit disposed in the sleeve 3 be plain or threaded as variously herein illustrated. The outside diameter of the sleeve 3 is such that it will extend freely into the bore of the coupling member 2 in assembling the coupling. As shown in FIG. 2, the axial extent of the sleeve 3 is somewhat greater than that of the coupling member 2, and upon assembling the sleeve in the bore of the coupling member 2, the beveled portion 16 of the sleeve will preferably conform to and engage the conical portion 15 of the bore of the coupling member 2.

The inner end of the sleeve 3 is provided with a mounting flange 17 extending radially outwardly therefrom and formed with openings 18 through which the fastenings 5 extend in securing the flange 17 between the mounting flange 4' on the fitting 4 and the flange 7 of the coupling member 1. With this arrangement the flange 17 serves as a sealing gasket at the joint of the coupling member 1 and the fitting 4.

Extending inwardly from the inner end of the sleeve 3 is a flange 19 forming a stop shoulder as indicated at 20. This shoulder acts as a stop for engaging the end of a conduit of different sizes when the latter is inserted into the sleeve.

An assembly of the three parts of the coupling may be effected by inserting the sleeve 3 into the bore of the coupling member 2 so that the beveled end portion 16 of the sleeve abuts the conical wall portion 15 of the bore of the member 2 as shown in FIG. 2 to limit the extension of the sleeve into this bore, whereby the mounting flange 17 of the sleeve is spaced well outwardly from the adjacent end of the coupling member 2. Next, the coupling member 1 is positioned over and in surrounding relation to the coupling member 2 so that the mounting flange 7 on the coupling member 1 will abut the mounting flange 17 of the sleeve 3. When the coupling member 1 is positioned in this manner with respect to the coupling member 2, the cam shoulders 9 and 10 thereon are disposed in front of and against the cam shoulders 11' and 12' on the member 2 thereby restraining movement of the member 2 outwardly through the bore of the member 1 but positioning these cam shoulders so that upon rotative movement of the member 2 it will move axially relative to the coupling member 1. When the holes for the screw fastenings 5 in the mounting flanges 7 and 17 are in alignment, this subassembly unit may be mounted on the fitting 4 by means of the screw fastenings 5. If desired, the sleeve 3 may be postioned first atop or against the fitting 4 and the coupling members 1 and 2 assembled thereover in the manner hereinbefore noted so that the fastenings 5 may be inserted to secure the coupling in assembled position on the fitting 4. Usually in preparing a coupling for a particular use it is mounted on a fitting best suited for that use when prepared for sale. However, it is apparent that the two coupling members 1 and 2, together with the sealing sleeve 3, constitute a complete coupling when assembled as here shown with the mounting flanges 7 and 17 subject to being secured to a support or fitting such as the one here shown. When the coupling member is assembled and fastened to the fitting 4 as shown in FIG. 2, the coupling member 1 is nonrotatable while the coupling member 2, although held against withdrawal axially through the coupling member 1 is, however, subject to rotative and axial movement relative to the coupling member 1.

Extent of the rotative movement of the coupling member 2 required to move it axially sufficiently to distort the sealing sleeve into gripping and sealing engagement with the conduit depends upon the diameter of the conduit. The rise of cam shoulders 10', i.e., the helix angle of said shoulders, and the angle of divergence of conical surface 15 in the end of coupling member 2 are preferably such that 180° of rotative movement of coupling member 2 will effect inward deformation of the outer end of sleeve 3 beyond the distance required to effectively sealingly embrace the smaller size conduit for which the coupling is designed. In this connection, upon clockwise movement of the member 2 from the position shown in FIG. 2 when the conduit 6 is positioned within the sealing sleeve 3, the coupling member 2 will be moved axially inwardly toward the fitting 4 and in so moving will cause the conical portion 15 of the member 2 to wedge against the beveled end portion 16 of the sealing sleeve 3 and thereby distort the sleeve into gripping and sealing engagement with the conduit as shown in FIG. 4. During this operation the deformation of the sealing sleeve is uniform throughout the circumference thereof so that the inner surface of the beveled end portion is forcibly engaged uniformly with the periphery of the conduit to provide a reliable fluid tight seal. At the same time, the resilient flange 17 clamped between the mounting flanges 7 and 4' of the member 1 and fitting 4, respectively, prevents leakage between flanges 7 and 4'.

Since the inner end of the conduit 6 is mounted or supported wholly within the sleeve 3, it will be recognized that reasonable flexibility of the union is permitted. Moreover, alignment of conduit 6 and fitting 4 is not critical since the beveled end of sleeve 3 will form an effective seal about the conduit 6 notwithstanding relative misalignment. An effective sealed coupling can also be obtained in the event that the inner extremity of the conduit 6 terminates short of the shoulder 20.

The coupling may be quickly disconnected by grasping the outer end of the coupling member 2 and rotating it in a counterclockwise direction, thereby moving the member 2 axially outwardly in such a manner that the conical wall portion 15 thereof releases pressure against the sealing sleeve 3 whereby the conduit 6 is released and readily may be withdrawn from the coupling. Due to the elasticity of the sealing sleeve, it will assume the position shown in FIG. 2 when the coupling member 2 is returned to the releasing or normal position there shown.

The wedging action of conical surface 16 on coupling member 2 on the beveled end of sealing sleeve 3 is such that axial pull on the union will effect tighter wedging of the sealing sleeve into coupling engagement with the conduit.

Referring to FIG. 4, there is illustrated a double ended coupling comprising a pair of similar couplings as heretofore described disposed in back-to-back relation with the resilient sleeve flanges 17, 17 coengaged and manually clamped between the opposed flanges 7, 7 of the respective coupling members 1, 1. As shown in FIG. 4 more particularly, the double ended coupling will accommodate the ends of different sizes and different types of tubing. In this connection there is illustrated a relatively small diameter plain end tubing designated 6a at the right hand side of the double ended coupling, and a larger diameter threaded end tubing or pipe designated 6b in the left hand end of the double ended coupling. Moreover, as referred to above, axial alignment and relative axial spacing of the tubings is not critical to effect sealing engagement of the resilient sleeves 3, 3 with the respective tubings. It will be evident upon reference to the embodiment of FIG. 4 that the coengaged resilient flanges 17 effectively constitute a single sealing flange which is clamped between the clamping flanges 7 by the screw fasteners 5, and likewise the resilient sealing sleeves 3 are effectively united as a unitary element. However, by reason of the fact that the respective coupling units are identical in construction and may be disposed back to back to accomplish the double ended coupling in FIG. 4, the coupling has a greater flexibility of usage.

As shown in FIG. 6, a plug made of plastic or any other suitable material and designated P may be positioned in the sealing sleeve 3 and releasably gripped thereby so as to close the bore through the coupling, this plug being used when the coupling is coupled to an outlet fititng and it is desired to plug the conduit to prevent leakage through the coupling or entrance of foreign matter into the coupling.

The construction of the coupling is such that the parts thereof conveniently may be die cast or molded, no finish machining or close tolerances being required as to the cam means and other parts, in view of the manner in which the sealing sleeve may be distorted to releasably grip and seal conduits having an appreciable range of different diameters.

While the coupling is ideally suited for use in connection with pipes and conduits of different sizes, it is to be understood that it is contemplated that it may be used to advantage for coupling objects other than pipes and conduits, since in one size it will accommodate objects of different diameters, and in each case may be quickly and easily coupled and uncoupled with assurance of a reliable coupling and sealing action.

While specific structural details have been shown and described, it should be understood that changes and alterations may be resorted to without departing from the spirit of the invention as defined in the appended claims.

I claim:

1. A coupling comprising: a pair of coupling members having through bores and mounted one within the bore of the other for relative rotative and axial movement; means on the outer coupling member providing for nonrotative mounting thereof on a fitting; a sealing sleeve of elastic material mounted in the bore of the inner of the coupling members so as to be deformable relative thereto; said sleeve being adapted to receive therein an end portion of a conduit to be connected to the coupling; mounting and sealing means on said sleeve affording the fastening thereof to said outer coupling member and the formation of a seal between said outer coupling member and said fitting; means on said sleeve and said inner coupling member, respectively, cooperable for deforming said sleeve into gripping and sealing engagement with the conduit in response to axial movement of said inner coupling member relative to said sleeve; and means on said coupling members cooperable to effect said axial movement in response to rotative movement of said inner coupling member.

2. A coupling comprising: a pair of coupling members having through bores and mounted one within the other for relative rotative and axial movement; a sealing sleeve of elastic material lining the bore of the inner coupling member and adapted to surround an end portion of a conduit to be coupled to the coupling; said sealing sleeve having a shoulder internally thereof for engaging an end of the conduit; said inner coupling member having a portion of the wall of the bore thereof disposed to move axially relative to said sleeve to urge a circumferential portion of the sleeve into gripping and sealing engagement with the conduit upon relative axial movement of said coupling members; means on said coupling members cooperable to effect said relative axial movement in response to relative rotative movement of said coupling members; a sealing flange extending radially outwardly from one end of said sleeve; and a mounting flange on the outer coupling member adapted to be mounted on a support with said sealing flange forming a seal against said support and said mounting flange; said two flanges having registering openings for reception of fastening means to secure said flanges to said support whereby said outer coupling member and said sleeve are secured to said support.

3. A coupling comprising: a pair of coupling members each having a through bore; one of said coupling members being mounted within the bore of the other coupling member for relative rotative and axial movement; a mounting flange on an end of the outer of said coupling members for nonrotatably securing said outer coupling member to a member for supporting the coupling; a circumferentially continuous sleeve of elastic material mounted in the bore of the inner of said coupling members for receiving an end portion of a conduit to be connected to the coupling; said sleeve having a portion at one end extending radially outwardly therefrom for disposition between said mounting flange and the supporting member for the coupling; said inner coupling member having at one end a wall portion interiorly thereof movable axially relative to said sleeve for deforming said sleeve to grip and form a seal around said conduit in response to axial movement of said inner coupling member; and cam means respectively on the other ends of said coupling members cooperable to effect said axial movement in response to rotative movement of said inner coupling member.

4. A coupling comprising: a pair of coupling members each having a through bore; one of said coupling members being mounted within the bore of the other coupling member for relative rotative and axial movement; a mounting flange on an end of the outer of said coupling members for nonrotatably securing said outer coupling member to a member for supporting a coupling; a circumferentially continuous sleeve of elastic material mounted in the bore of the inner of said coupling members for receiving an end portion of a conduit to be connected to the coupling; said sleeve having an internal shoulder for engaging an end of said conduit; said sleeve having an external portion at one end for disposition between said mounting flange and the supporting member for the coupling to secure the sleeve in place and provide a seal against said supporting member and said mounting flange; said inner coupling member having a wall portion interiorly thereof operable for deforming said sleeve to grip and form a seal around said conduit in response to axial movement of said inner coupling member relative to said sleeve; and cam means on said coupling members cooperable to effect said axial movement in response to rotative movement of said inner coupling member.

5. A coupling comprising: a fitting having a through bore; a pair of coupling members having through bores and mounted one within the bore of the other for relative rotative and axial movement; means joining the outer of said coupling members to said fitting; a sealing sleeve in the bore of the inner of said coupling member for receiving an end portion of a conduit to be connected to the coupling; said sleeve having its bore aligned with the bore of said fitting; said inner coupling member and said sleeve having opposed smooth cylindrical surfaces affording axial sliding movement of the inner coupling member relative to said sleeve; means on an end of said inner coupling member operable for deforming said sleeve into gripping and sealing engagement with said conduit in response to axial movement of said inner coupling member; relative to said sleeve; means on said coupling members cooperable to effect said axial movement in response to rotative movement of said inner coupling member; and flanges on one end of said sleeve extending radially therefrom in opposite directions for contact with said conduit and said mounting member, respectively.

6. A coupling unit comprising: a fitting having a bore therethrough for the passage of fluid; a pair of coupling members each having a bore therethrough; one of said coupling members being mounted in the bore of the other for relative rotative and axial movement; means securing an end of the outer of said coupling members to said fitting; a sealing sleeve of elastic material mounted in the bore of the inner of said coupling members with the bore thereof in registration with the bore through said fitting and adapted to receive an end portion of a conduit to be connected to the coupling; said sealing sleeve having at one end a flange disposed between the outer coupling member and said fitting; said inner coupling member having a smooth cylindrical bore portion for the greater portion of its length and being provided with an inclined portion surrounding the other end of said sleeve and operable to deform said other end of the sleeve into gripping and sealing engagement with said conduit in response to axial movement of said inner coupling member relative to said sleeve; and means located respectively at the other ends of said coupling members cooperable to effect said axial movement of said inner coupling member in response to rotative movement of said inner coupling member; said sleeve having a cylindrical outer surface extending for the greater part of the length of the sleeve and disposed opposite said smooth cylindrical bore portion of said inner coupling member.

7. A coupling unit comprising: an outer annular coupling member; an inner annular coupling member rotatably disposed in said outer annular member; said outer annular member having at one end an annular mounting flange for connection with a support for the coupling unit; said outer annular member also having at its other end a radially inwardly extended flange providing an internal radial cam surface extending helically; said inner annular member having an outwardly flange engageable with said cam surface for causing movement of said inner annular member longitudinally within said outer annular member upon rotation of said inner annular member; a resilient sleeve disposed within said inner annular member and having at one end a portion projecting radially into sealing contact with said annular mounting flange end said support; and said inner annular member and said sleeve having coengageable radially projecting surfaces for deforming said sleeve radially inwardly upon rotation of said inner annular member and consequent longitudinal movement of said inner annular member relative to said sleeve.

8. A coupling assembly comprising: a pair of members having bores; means securing said members together with said bores aligned; each of said members having coupling means; one of said coupling means including a resilient sleeve disposed in the bore of one of said members; a flange on said sleeve disposed between and sealingly engaged with said pair of members; sleeve deforming means including an annular element disposed about said sleeve and rotatable and longitudinally shiftable relative to said sleeve; coengageable means on said annular element and said one member for effecting such longitudinal movement upon such rotation; and means on said annular element and said sleeve for deforming radially inwardly an annular portion of said sleeve into sealing engagement with a conduit upon such longitudinal movement of said annular member relative to said sleeve.

9. A coupling assembly comprising: a pair of members having bores; means securing said members together with said bores aligned; each of said members having coupling means including a resilient sleeve disposed in the bores of said members; sleeve deforming means including an annular element disposed about said sleeve within the respective members and rotatable and longitudinally shiftable relative to the respective sleeves; coengageable means on said annular element and the respective members for effecting such longitudinal movement upon such rotation; means on corresponding ends of said annular element and said sleeve for deforming radially inwardly an annular portion of said sleeve into sealing engagement with a conduit upon such longitudinal movement of said annular member; and a sealing flange projecting radially from said sleeve and sealingly engaged between said members.

10. A coupling assembly comprising: a pair of outer annular coupling members; a tubular resilient sealing sleeve assembly disposed within said pair of coupling members and having means sealingly engaged between said pair of coupling members; a pair of inner annular coupling members interposed between said pair of outer annular coupling members and said sealing sleeve assembly and respectively having means axially slidably engageable with said sealing sleeve assembly for deflecting axially spaced circumferential sections of said sealing sleeve assembly inwardly into sealing engagement with a conduit upon relative axial movement between said pair of inner annular coupling members and said sleeve assembly; and coengageable means on said outer pair of annual coupling members and said inner pair of annular coupling members, respectively, for effecting such axial movement of said inner pair of annular coupling members upon relative rotation between said outer pair of said annular coupling members and said inner pair of annular coupling members.

References Cited by the Examiner
UNITED STATES PATENTS

| | | | |
|---|---|---|---|
| 561,442 | 6/96 | Schmidt | 285—322 |
| 1,363,974 | 12/20 | Heylman | 285—356 |
| 1,683,076 | 9/28 | Johnson et al. | 285—356 |
| 1,830,973 | 3/31 | Wheaton | 285—377 |
| 2,127,284 | 8/38 | Board | 285—356 |
| 2,268,263 | 12/41 | Newell et al. | 285—356 |

OTHER REFERENCES

| | | |
|---|---|---|
| 1,214,555 | 11/59 | France. |
| 294,437 | 11/53 | Switzerland. |

CARL W. TOMLIN, *Primary Examiner.*

UNITED STATES PATENT OFFICE
CERTIFICATE OF CORRECTION

Patent No. 3,197,242                                                    July 27, 1965

Kenneth A. Milette

It is hereby certified that error appears in the above numbered patent requiring correction and that the said Letters Patent should read as corrected below.

Column 7, line 55, after "outwardly" insert -- extending --.

Signed and sealed this 15th day of March 1966.

(SEAL)
Attest:

ERNEST W. SWIDER                                    EDWARD J. BRENNER
Attesting Officer                                          Commissioner of Patents